(12) United States Patent
Krzyzanowski et al.

(10) Patent No.: US 7,761,505 B2
(45) Date of Patent: Jul. 20, 2010

(54) SYSTEM, METHOD AND COMPUTER PROGRAM PRODUCT FOR CONCURRENT PERFORMANCE OF VIDEO TELECONFERENCE AND DELIVERY OF MULTIMEDIA PRESENTATION AND ARCHIVING OF SAME

(75) Inventors: Paul Krzyzanowski, Fanwood, NJ (US); John Trotter, Berkeley Heights, NJ (US); Michael Pitts, Lake Worth, FL (US)

(73) Assignee: OpenPeak Inc., Boca Raton, FL (US)

( * ) Notice: Subject to any disclaimer, the term of this patent is extended or adjusted under 35 U.S.C. 154(b) by 89 days.

(21) Appl. No.: 10/356,528

(22) Filed: Feb. 3, 2003

(65) Prior Publication Data

US 2004/0098456 A1    May 20, 2004

Related U.S. Application Data

(60) Provisional application No. 60/426,823, filed on Nov. 18, 2002.

(51) Int. Cl.
G06F 15/16 (2006.01)
G06F 13/00 (2006.01)
(52) U.S. Cl. .................................................. 709/204
(58) Field of Classification Search ............... 709/204, 709/217, 245, 219, 225, 231, 246, 203, 205; 725/101; 370/260; 345/753, 730, 751, 804, 345/2.2; 715/500.1; 455/404.1; 434/350, 434/308; 710/65; 707/104.1; 386/69; 379/37; 348/584; 382/232
See application file for complete search history.

(56) References Cited

U.S. PATENT DOCUMENTS

| | | | | |
|---|---|---|---|---|
| 5,363,482 | A | * 11/1994 | Victor et al. | 345/804 |
| 5,471,318 | A |   11/1995 | Ahuja et al. | |
| 5,475,421 | A | * 12/1995 | Palmer et al. | 348/14.1 |
| 5,532,937 | A |    7/1996 | Graziano et al. | |
| 5,608,872 | A | *  3/1997 | Schwartz et al. | 709/205 |
| 5,613,032 | A | *  3/1997 | Cruz et al. | 386/69 |
| 5,617,539 | A |    4/1997 | Ludwig et al. | |
| 5,630,067 | A |    5/1997 | Kindell et al. | |

(Continued)

FOREIGN PATENT DOCUMENTS

JP          06169456          6/1994

(Continued)

OTHER PUBLICATIONS

Mark Fuerst, "EIIP Classroom Online Presentation", Aug. 19, 1998, Carley Corp., 9 pages.*

(Continued)

*Primary Examiner*—Robert B Harrell
(74) *Attorney, Agent, or Firm*—Fiala & Weaver P.L.L.C.

(57) ABSTRACT

A video teleconferencing and multimedia presentation system is provided. The system is integrated and network-ready to facilitate ease of set-up and operation, and also utilizes IP and/or wireless networking to provide advanced features and functionality, such as remote access and control and the ability to perform secure archiving and retrieval of recorded video and audio data. The system further utilizes a unique peer-to-peer conference network solution in order to address the bandwidth limitations that plague conventional systems and allow enhanced viewing of high-bandwidth applications.

44 Claims, 10 Drawing Sheets

U.S. PATENT DOCUMENTS

| | | | |
|---|---|---|---|
| 5,736,968 A * | 4/1998 | Tsakiris | 345/2.2 |
| 5,764,982 A | 6/1998 | Madduri | |
| 5,767,897 A * | 6/1998 | Howell | 348/14.07 |
| 5,808,662 A | 9/1998 | Kinney et al. | |
| 5,812,552 A * | 9/1998 | Arora et al. | 370/395.53 |
| 5,822,525 A * | 10/1998 | Tafoya et al. | 709/204 |
| 5,828,839 A * | 10/1998 | Moncreiff | 709/204 |
| 5,838,912 A | 11/1998 | Poon et al. | |
| 5,844,979 A * | 12/1998 | Raniere et al. | 379/202.01 |
| 5,872,923 A | 2/1999 | Schwartz et al. | |
| 5,896,565 A * | 4/1999 | Miller | 455/404.1 |
| 5,931,906 A * | 8/1999 | Fidelibus et al. | 709/217 |
| 5,943,046 A * | 8/1999 | Cave et al. | 715/716 |
| 5,963,547 A * | 10/1999 | O'Neil et al. | 370/260 |
| 5,968,120 A * | 10/1999 | Guedalia | 709/219 |
| 6,073,192 A * | 6/2000 | Clapp et al. | 710/65 |
| 6,091,408 A * | 7/2000 | Treibitz et al. | 345/753 |
| 6,108,687 A * | 8/2000 | Craig | 709/203 |
| 6,144,848 A | 11/2000 | Walsh et al. | |
| 6,151,619 A * | 11/2000 | Riddle | 709/204 |
| 6,161,137 A | 12/2000 | Ogdon et al. | |
| 6,195,683 B1 * | 2/2001 | Palmer et al. | 709/204 |
| 6,209,021 B1 * | 3/2001 | Ahimovic et al. | 709/204 |
| 6,212,547 B1 | 4/2001 | Ludwig et al. | |
| 6,233,428 B1 * | 5/2001 | Fryer | 434/308 |
| 6,249,281 B1 * | 6/2001 | Chen et al. | 345/753 |
| 6,278,478 B1 * | 8/2001 | Ferriere | 348/14.1 |
| 6,285,391 B1 * | 9/2001 | Shibata et al. | 348/14.07 |
| 6,314,569 B1 | 11/2001 | Chernock et al. | |
| 6,317,777 B1 | 11/2001 | Skarbo et al. | |
| 6,320,588 B1 * | 11/2001 | Palmer et al. | 345/473 |
| 6,321,252 B1 | 11/2001 | Bhola et al. | |
| 6,343,313 B1 | 1/2002 | Salesky et al. | |
| 6,349,286 B2 | 2/2002 | Shaffer et al. | |
| 6,351,762 B1 | 2/2002 | Ludwig et al. | |
| 6,356,943 B2 | 3/2002 | Murray et al. | |
| 6,369,847 B1 * | 4/2002 | James et al. | 348/14.01 |
| 6,397,251 B1 * | 5/2002 | Graf | 709/225 |
| 6,404,928 B1 * | 6/2002 | Shaw et al. | 382/232 |
| 6,417,933 B1 * | 7/2002 | Szurkowski | 358/442 |
| 6,421,706 B1 * | 7/2002 | McNeill et al. | 709/204 |
| 6,480,584 B2 * | 11/2002 | Duran et al. | 379/93.21 |
| 6,532,218 B1 * | 3/2003 | Shaffer et al. | 370/260 |
| 6,563,914 B2 * | 5/2003 | Sammon et al. | 379/202.01 |
| 6,577,324 B1 * | 6/2003 | Palmer et al. | 715/705 |
| 6,598,075 B1 * | 7/2003 | Ogdon et al. | 709/204 |
| 6,629,107 B1 * | 9/2003 | Ouchi et al. | 707/104.1 |
| RE38,284 E * | 10/2003 | Allen et al. | 715/500.1 |
| 6,654,814 B1 * | 11/2003 | Britton et al. | 709/246 |
| 6,728,753 B1 * | 4/2004 | Parasnis et al. | 709/203 |
| 6,728,784 B1 * | 4/2004 | Mattaway | 709/245 |
| 7,035,897 B1 * | 4/2006 | Devereaux et al. | 709/203 |
| 7,102,643 B2 * | 9/2006 | Moore et al. | 345/473 |
| 2001/0029457 A1 | 10/2001 | Shaffer et al. | |
| 2001/0042096 A1 | 11/2001 | Ichiyoshi | |
| 2002/0019845 A1 * | 2/2002 | Hariton | 709/205 |
| 2002/0023081 A1 | 2/2002 | Bazan et al. | |
| 2002/0080280 A1 * | 6/2002 | Champion et al. | 348/584 |
| 2002/0087333 A1 | 7/2002 | Chen | |
| 2002/0087638 A1 | 7/2002 | Rhee et al. | |
| 2002/0091768 A1 | 7/2002 | Balasubramanian | |
| 2002/0091769 A1 | 7/2002 | Drozdzewicz et al. | |
| 2002/0091771 A1 | 7/2002 | Agraharam et al. | |
| 2002/0095460 A1 | 7/2002 | Benson | |
| 2002/0095462 A1 | 7/2002 | Beck et al. | |
| 2002/0103864 A1 | 8/2002 | Rodman et al. | |
| 2002/0116462 A1 | 8/2002 | DiGiano et al. | |
| 2002/0149617 A1 * | 10/2002 | Becker | 345/751 |
| 2002/0168621 A1 * | 11/2002 | Cook et al. | 434/350 |
| 2003/0005462 A1 * | 1/2003 | Broadus et al. | 725/110 |
| 2003/0080999 A1 * | 5/2003 | Stone et al. | 345/751 |
| 2003/0090506 A1 * | 5/2003 | Moore et al. | 345/730 |
| 2003/0105650 A1 * | 6/2003 | Lombardo et al. | 705/2 |
| 2003/0110218 A1 * | 6/2003 | Stanley | 709/204 |
| 2003/0118167 A1 * | 6/2003 | Sammon et al. | 379/202.01 |
| 2003/0140348 A1 * | 7/2003 | Stewart | 725/101 |
| 2003/0172174 A1 * | 9/2003 | Mihalcheon | 709/231 |
| 2003/0233417 A1 * | 12/2003 | Beyda et al. | 709/206 |
| 2004/0086093 A1 * | 5/2004 | Schranz | 379/37 |
| 2004/0095461 A1 * | 5/2004 | Monagahn et al. | 348/14.08 |
| 2004/0172658 A1 * | 9/2004 | Rakib et al. | 725/120 |
| 2004/0203708 A1 * | 10/2004 | Khan et al. | 455/422.1 |
| 2005/0277872 A1 * | 12/2005 | Colby et al. | 604/67 |

FOREIGN PATENT DOCUMENTS

| | | |
|---|---|---|
| JP | 2000224557 | 8/2000 |
| JP | 2000341659 | 12/2000 |
| JP | 2002223423 | 8/2002 |
| JP | 02262251 | 9/2002 |

OTHER PUBLICATIONS

Paul Lettieri et al., "Advances in Wireless Terminals", pp. 6-19, published 1999.*

Copending U.S. Appl. No. 10/180,500, inventors Krzyzanowksi et al., filed Jun. 27, 2002.

* cited by examiner

SYSTEM, METHOD AND COMPUTER PROGRAM PRODUCT FOR CONCURRENT PERFORMANCE OF VIDEO TELECONFERENCE AND DELIVERY OF MULTIMEDIA PRESENTATION AND ARCHIVING OF SAME

This application claims the benefit of U.S. Provision Application No. 60/426,823, filed Nov. 18, 2002.

BACKGROUND OF THE INVENTION

1. Field of the Invention

The present invention generally relates to video teleconferencing and multimedia presentations. More particularly, the present invention relates to systems, methods and computer program products for performing video teleconferences and/or delivering multimedia presentations.

2. Background

Conventional video teleconferencing and multimedia presentation systems are often difficult to install and operate due to their complexity. For example, conventional systems typically consist of disparate components, such as a camera, display, and/or telephone, that were originally designed as stand-alone devices. Such components are typically made by different manufacturers using different technology based on different standards, and as a result, are difficult to integrate without an experienced audio-visual integrator and custom software. These limitations translate directly into higher costs for system owners.

Furthermore, conventional video teleconferencing and multimedia presentation systems are limited in their ability to present high-bandwidth intensive applications, such as animated presentations using Microsoft® PowerPoint™ or Macromedia® Flash™ technology. These presentations do not translate well at local/remote sites viewing them in real time due to delays caused by network bandwidth limitations. For example, in conventional systems, network bandwidth limitations may cause the quality and speed of the presentation data received by local/remote systems to be diminished, resulting in poor slide-to-slide transitions, delays, and choppiness for those viewing the presentations in real time at the local/remote sites.

Additionally, conventional video teleconferencing and multimedia presentation systems do not provide an easy method for remotely configuring, monitoring and controlling the system, or for archiving and retrieving recorded video teleconferences and/or multimedia presentations.

BRIEF SUMMARY OF THE INVENTION

A fully integrated video teleconferencing and multimedia presentation system is provided that is simple and inexpensive to install and operate. The integrated video teleconferencing and multimedia presentation system provides advanced features, including the ability to concurrently perform video teleconferencing and provide high or medium bandwidth intensive presentations in real time with no degradation in the quality of the video teleconference or the presentation at local or remote sites. Furthermore, the integrated video teleconferencing and multimedia presentation system provides an easy method for remotely configuring, monitoring and controlling the system, as well as an easy method for archiving and retrieving recorded video teleconferences and/or multimedia presentations.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 6:
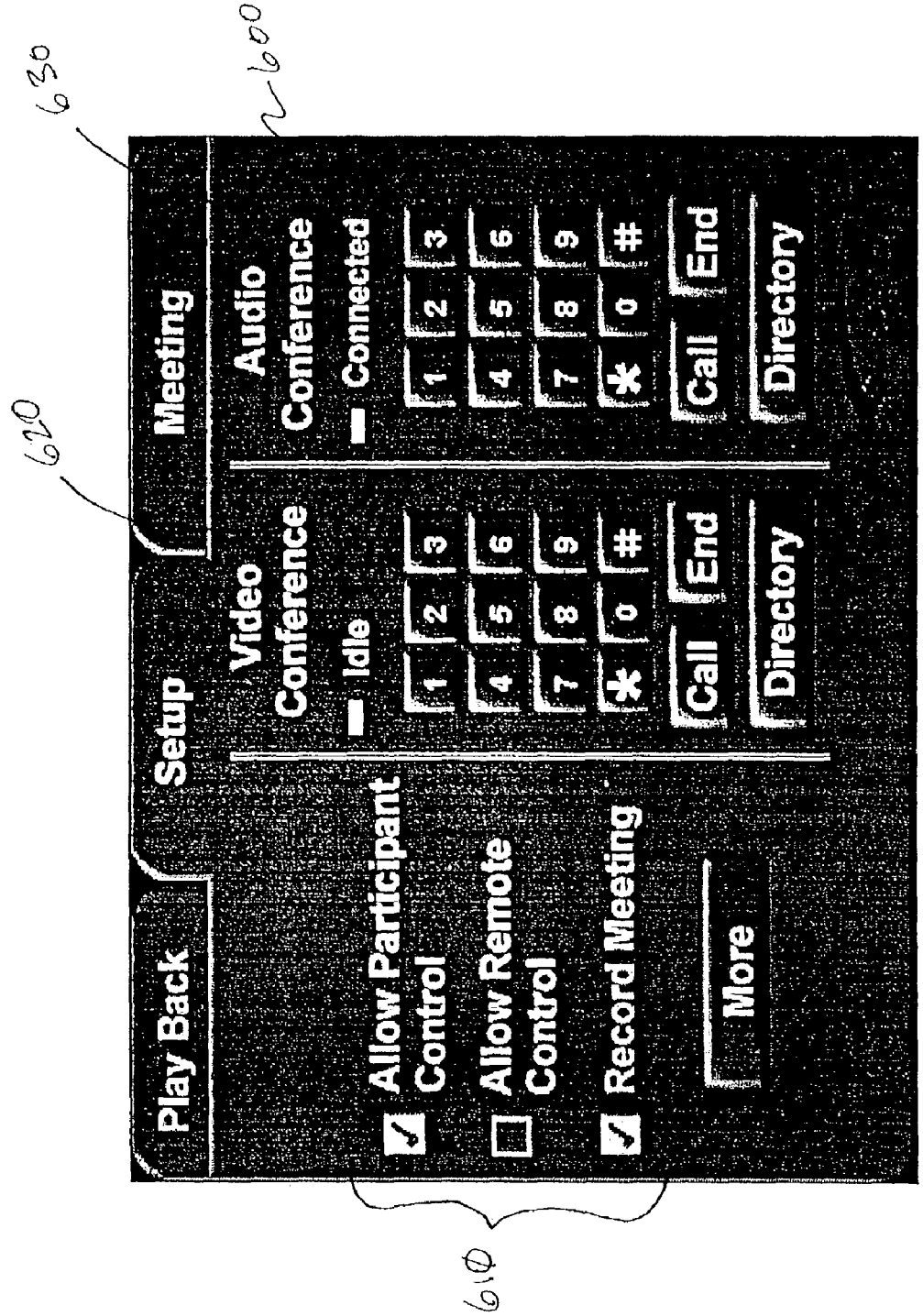
Figure 7:
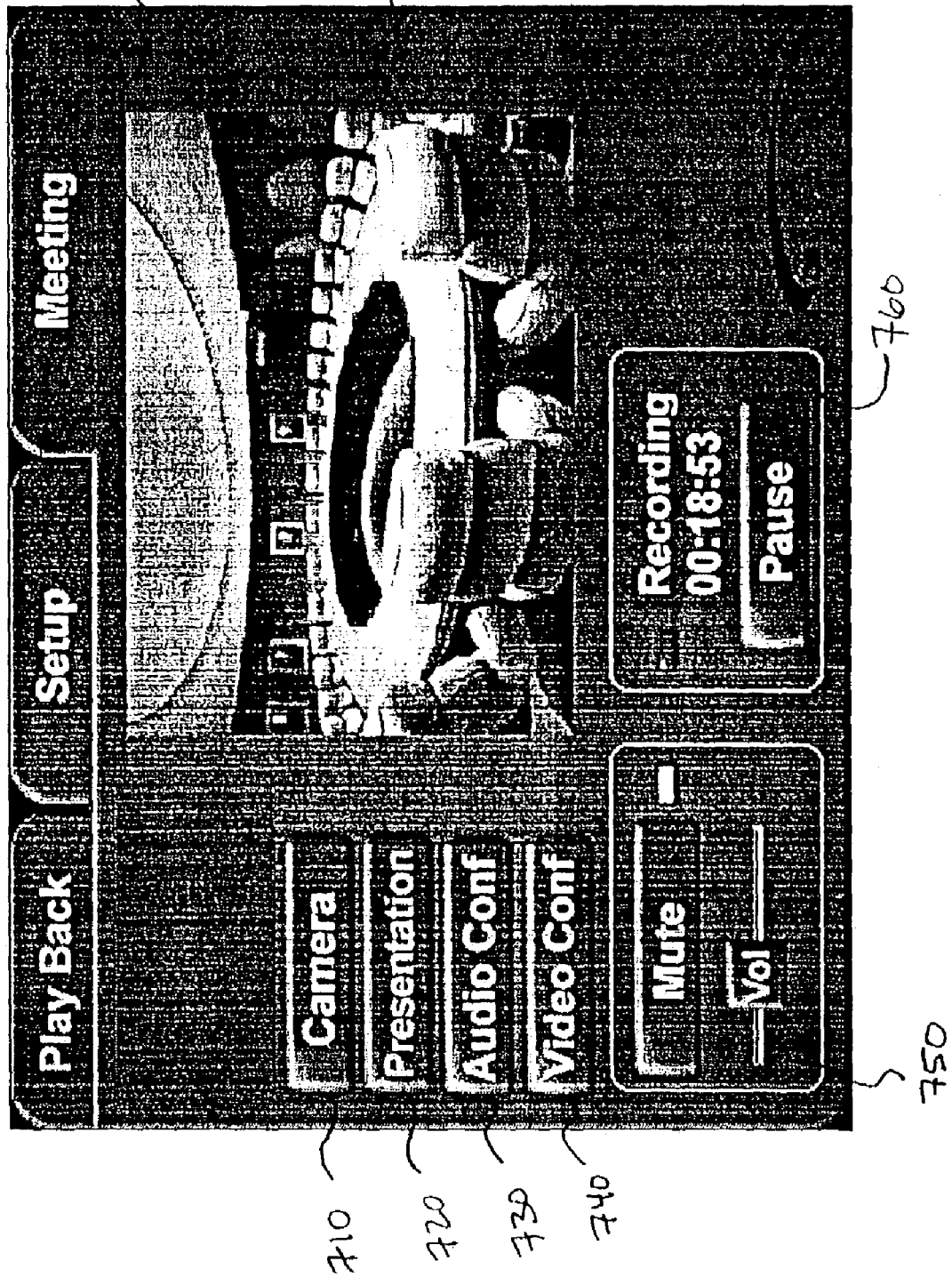
Figure 8:
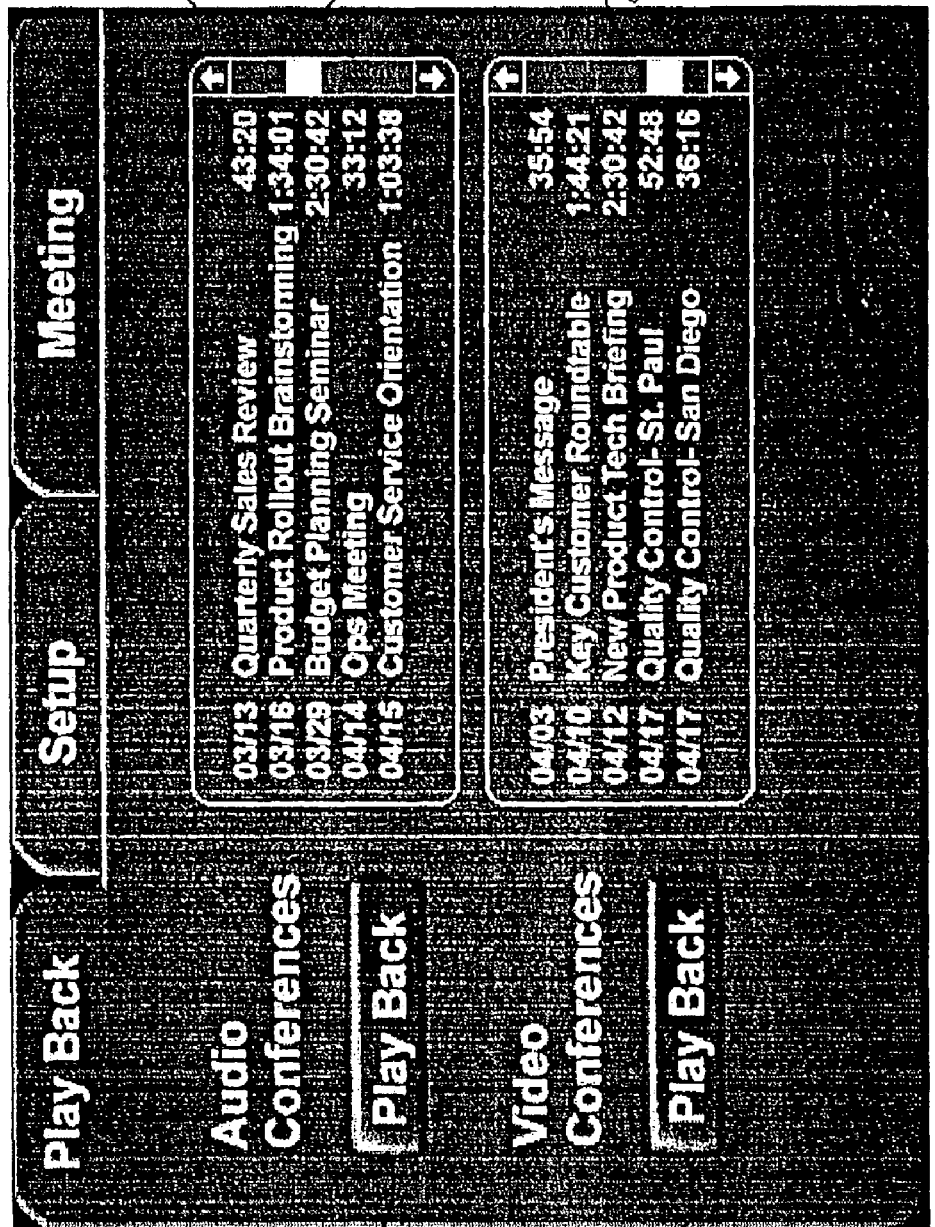
Figure 9:
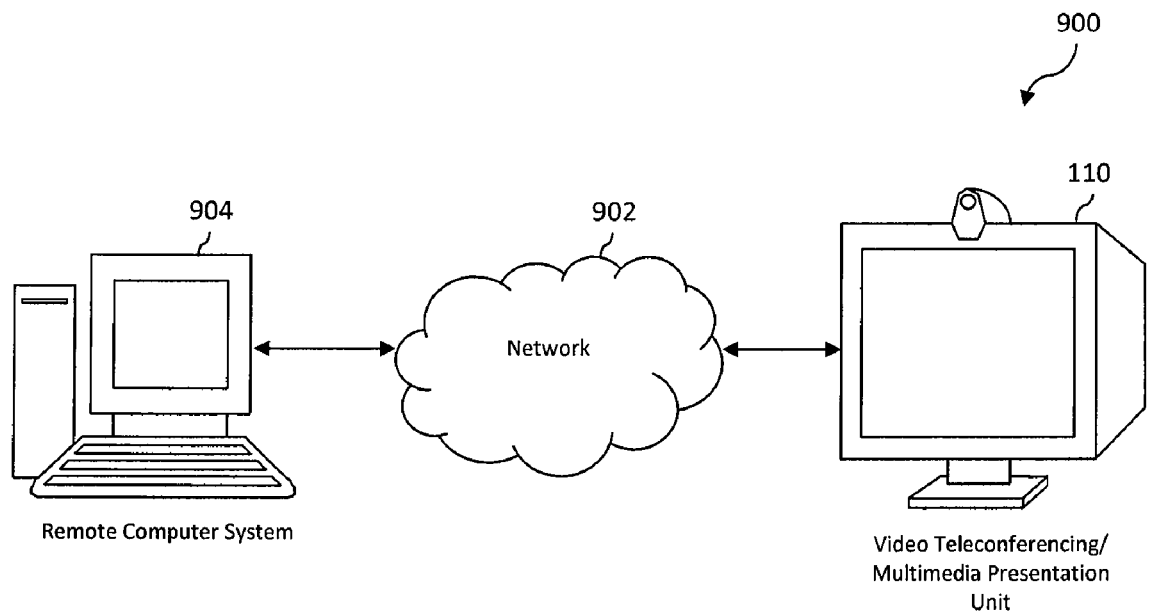

FIGS. 6, 7, and 8 depict exemplary graphical user interface (GUI) screens for an integrated video teleconferencing and multimedia presentation unit in accordance with an embodiment of the present invention FIG. 9 depicts an example system configuration for remote access and control of an integrated video teleconferencing and multimedia presentation unit in accordance with an embodiment of the present invention.

Figure 10:
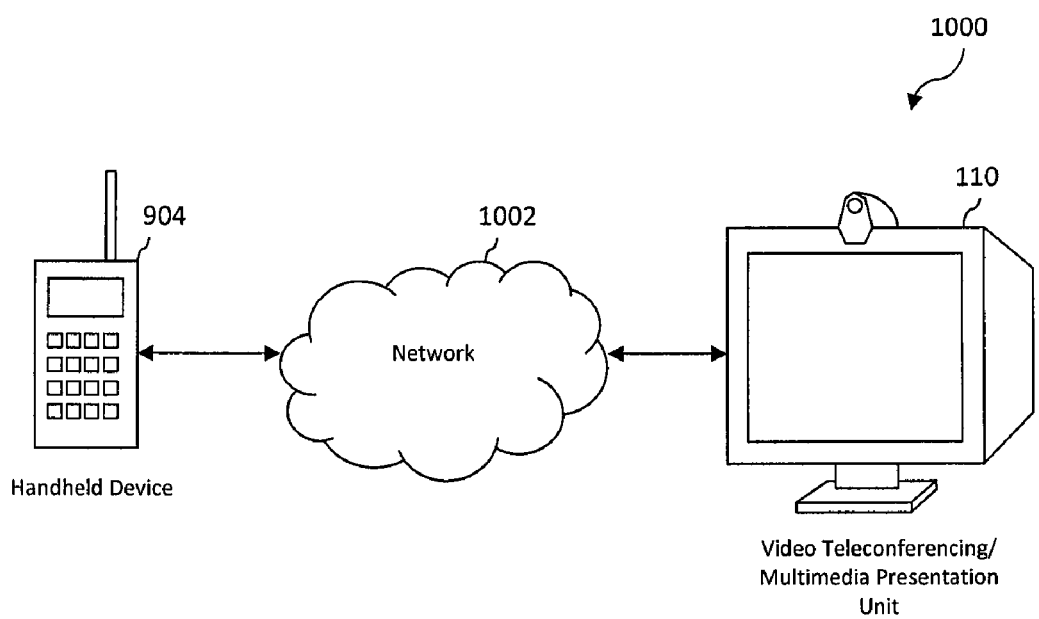

FIG. 10 depicts an example system configuration for wireless local control of an integrated video teleconferencing and multimedia presentation unit in accordance with an embodiment of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview

A video teleconferencing and multimedia presentation system in accordance with an embodiment of the present invention is provided. As will be described in more detail herein, the system is integrated and network-ready to facilitate ease of set-up and operation, and also utilizes IP and/or wireless networking to provide advanced features and functionality, such as remote access and control and the ability to perform secure archiving and retrieval of recorded video and audio data. The system further utilizes a unique peer-to-peer conference network solution in order to address the bandwidth limitations that plague conventional systems and allow enhanced viewing of high-bandwidth applications.

B. Example Operating Environment

Figure 1:
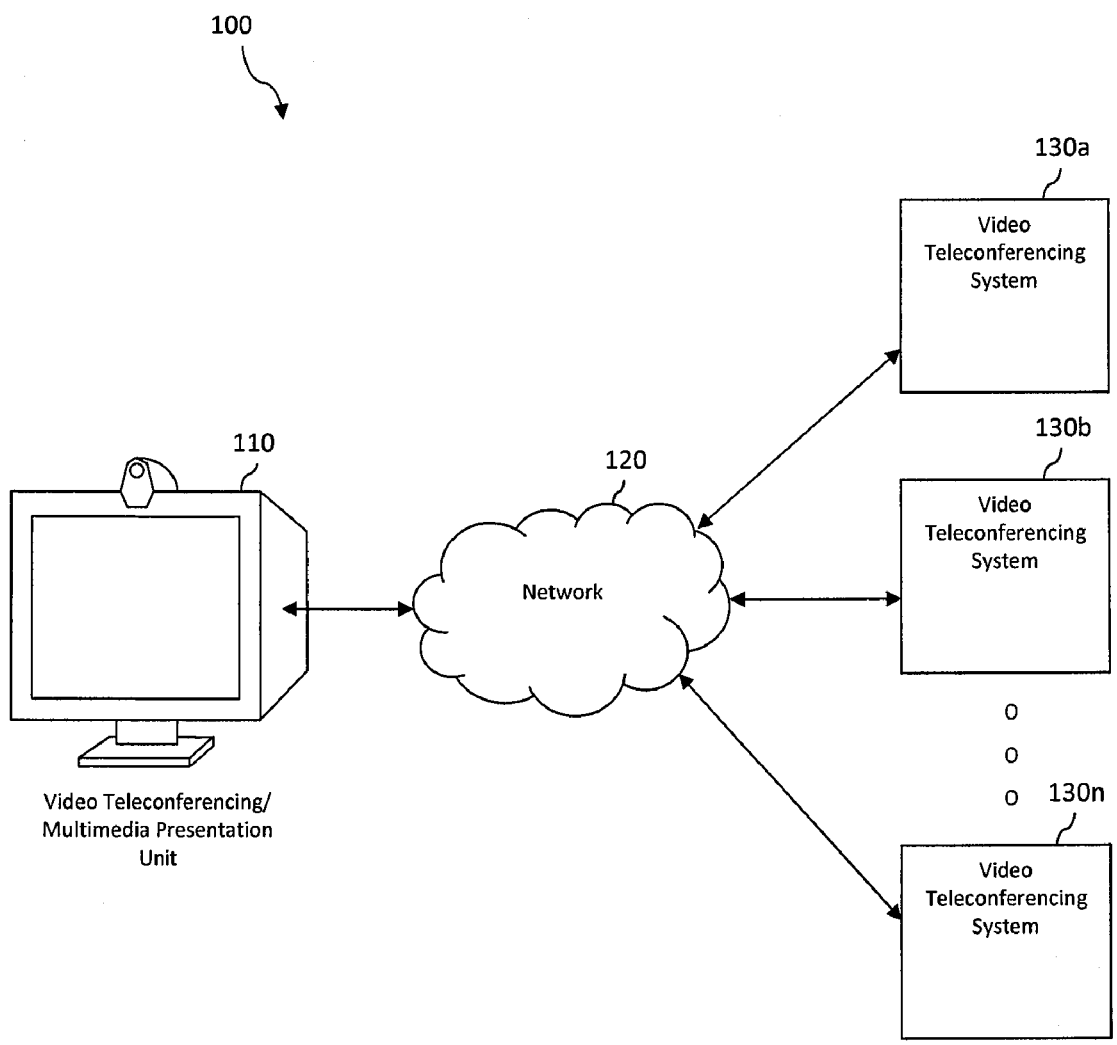
FIG. 1 depicts an example environment in which an embodiment of the present invention may operate.

FIG. 1 depicts an example environment 100 in which embodiments of the present invention may operate. It should be understood that example operating environment 100 is shown for illustrative purposes only and does not limit the present invention. Other implementations of example operating environment 100 will be apparent to persons skilled in the relevant art(s) based on the teachings contained herein, and the invention is directed to such other implementations.

As depicted in FIG. 1, example operating environment 100 includes an integrated video teleconferencing and multimedia presentation unit 110 in accordance with an embodiment of the present invention. Unit 110, which will be described in more detail herein, is communicatively connected via a network 120 to one or more video teleconferencing systems 130a through 130n. Unit 110 is configured to conduct video teleconferences with and concurrently provide multimedia presentations to any one or more of systems 130a-130n via network 120.

Network 120 facilitates the bi-directional transmission of video and audio data between unit 110 and systems 130a-130n, and the transmission of presentation data and control signals using a control protocol from unit 110 to systems 130a-130n. In an embodiment, network 120 comprises a packet-switched local area network (LAN), and preferably comprises a TCP/IP-based LAN. However, the present invention is not so limited and network 120 may comprise any type of computer network or combination of networks including, but not limited to, circuit switched and/or packet switched networks. Additionally, network 120 may comprise a variety of transmission mediums including, but not limited to twisted pair, coaxial cable, fiber-optic and/or wireless transmission mediums. In an alternate operating environment, network 120 includes a wide area network such as the Internet.

Each of systems 130a-130n can comprise any of a variety of video teleconferencing systems, including but not limited to H.323 and SIP-compliant video teleconferencing systems. As will be appreciated by persons skilled in the relevant art(s), H.323 refers to a standard approved by the International Telecommunication Union (ITU) that defines protocols and procedures for transmitting audio and video conferencing data across networks, while SIP (Session Initiation Protocol) refers to an Internet Engineering Task Force (IETF) standard protocol for initiating an interactive user session that involves multimedia elements such as video and voice. A variety of conventional H.323-compliant and SIP-compliant video teleconferencing systems are readily available and will be known to persons skilled in the relevant art(s). Alternately, at least one of systems 130a-130n comprises a video teleconferencing and multimedia presentation system that is identical to unit 110.

C. Video Teleconferencing and Multimedia Presentation Unit

In accordance with an embodiment of the present invention, all the necessary components for conducting a network-based video teleconference and multimedia presentation are integrated into the single video teleconferencing and multimedia presentation unit 110, thereby facilitating ease of set-up and operation and providing a single low-cost video teleconferencing solution.

Figure 2:
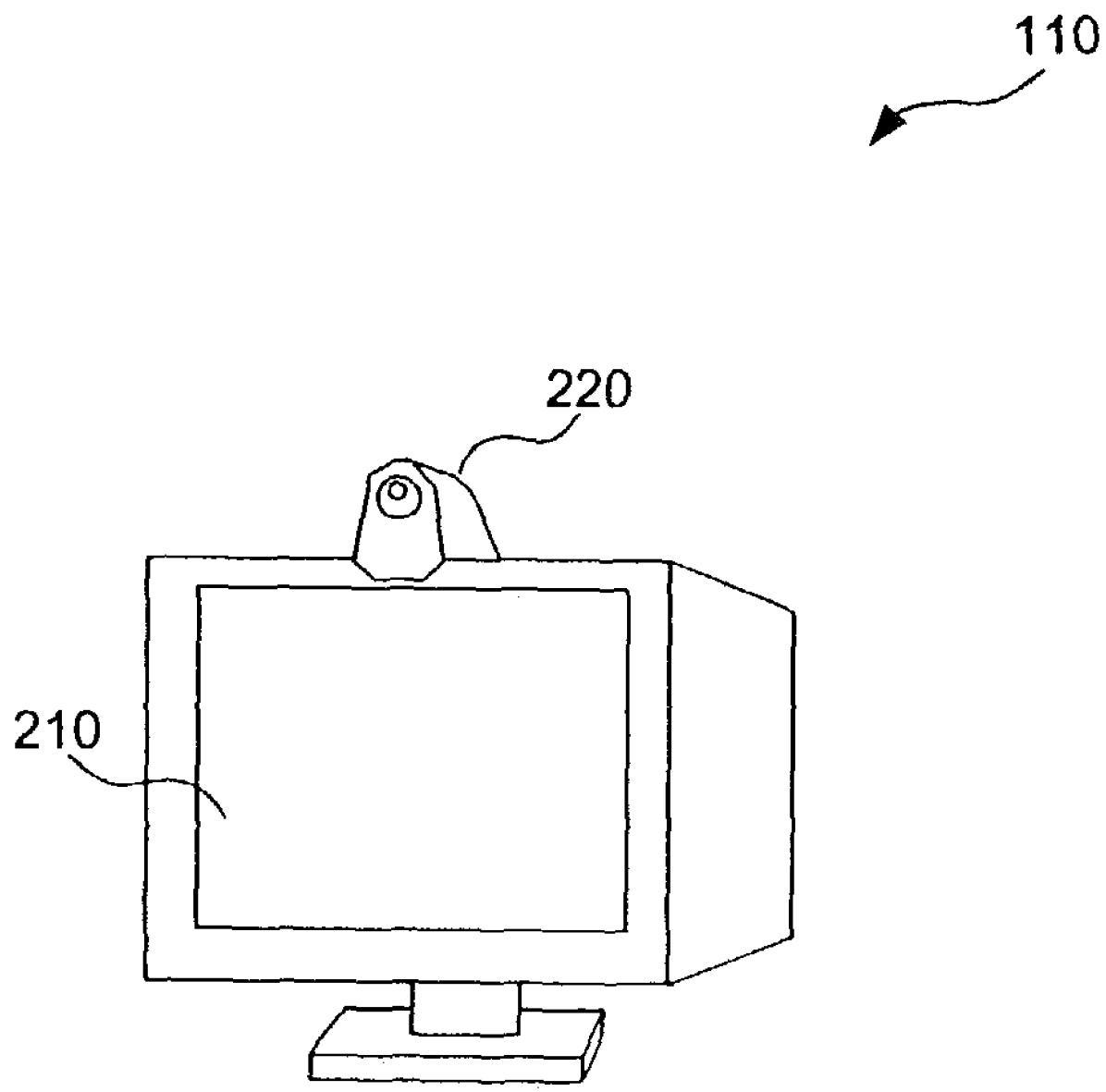
FIG. 2 depicts an external view of an integrated video teleconferencing and multimedia presentation unit in accordance with an embodiment of the present invention.

FIG. 2 depicts a simplified external view of an embodiment of unit 110, which includes a touch sensitive display 210 and a video camera 220. Touch sensitive display 210 comprises an LCD monitor and pressure-sensitive transparent panel that permits a user to activate all the necessary functions of unit 110 by touching appropriate portions of the display. In accordance with an embodiment of the invention, touch sensitive display 210 is the only user input/output (I/O) device necessary to operate unit 110. However, the invention is not so limited and unit 110 may be adapted to accommodate other user I/O devices, including but not limited to a keyboard and/or mouse, as well as remote control devices, as will be described in more detail herein. Additionally, the invention is not limited to touch sensitive displays, and also encompasses capacitive and optic-based touch/proximity displays.

In an embodiment, video camera 220 comprises a pan-tilt-zoom (PTZ) video camera that is permanently affixed to unit 110 via an adjustable mount that accommodates the pan, tilt, and zoom capabilities of the camera. Video camera 220 may also comprise other types of cameras, including but not limited to a pan-tilt (PT) camera or a fixed camera. Video camera 220 is coupled to unit 110 via an internal or external port, which may comprise, for example, a Universal Serial Bus (USB) port, an RS232 port, or a PCI port. This internal or external port provides a means for delivering video data from video camera 220 to the operating system running on unit 110.

In an alternate embodiment (not shown), video camera 220 is not permanently affixed to unit 110 but instead comprises a removably affixed or stand-alone device that is coupled to unit 110 via a wired connection, such as a USB or RS232 cable, or a wireless connection, such as an 802.11b or Bluetooth™ connection, to facilitate hand-held movement and positioning of the camera. In a still further embodiment (not shown), unit 110 includes at least two video cameras 220, one of which is affixed to unit 110 and one of which comprises a removably affixed or stand-alone device.

Figure 3A:
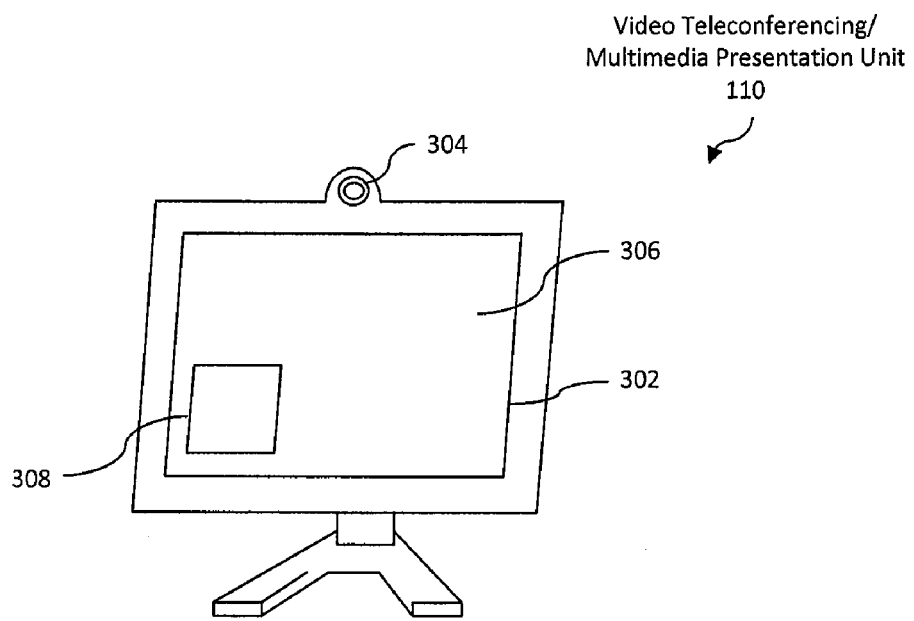
FIG. 3A depicts an external view of a single-display integrated video teleconferencing and multimedia presentation unit in accordance with an embodiment of the present invention.

FIG. 3A depicts an embodiment of unit 110 that includes a flat-panel touch sensitive display 302 and an integrated video camera 304. (The present invention is not limited to flat-panel displays, however, and may include standard displays as indicated by FIG. 2 as well as projection displays and plasma displays). As shown in FIG. 3A, display 302 is partitioned into at least a first display area, or window, 306 and a second display area, or window, 308. In accordance with an embodiment of the invention, unit 10 may be configured to display video data corresponding to a video teleconference in first display area 306 and video data corresponding to a multimedia presentation in second display area 308. Alternately, unit 110 may be configured to display video data corresponding to a multimedia presentation in first display area 306 and video data corresponding to a video teleconference in second display area 308. By partitioning display 302 into at least a first display area and a second display area, an embodiment of the present invention accommodates the simultaneous display of video data corresponding to a video teleconference and a multimedia presentation. In a further embodiment, unit 110 is also configured to display a graphical user interface (GUI) via display 310, as will be described in more detail herein.

Figure 3B:
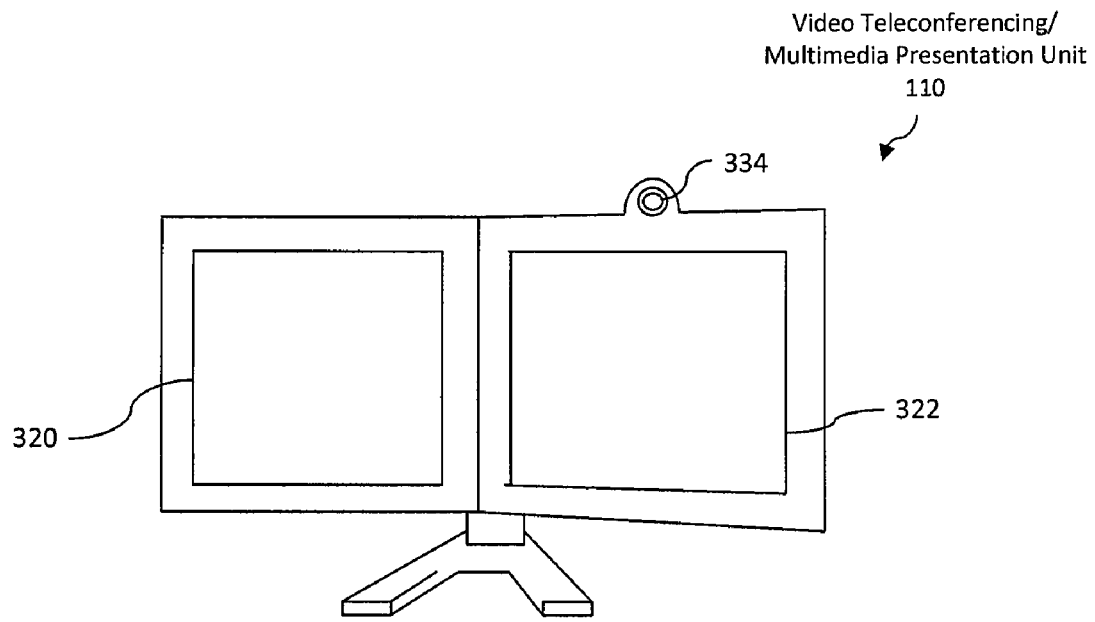
FIG. 3B depicts an external view of a dual-display integrated video teleconferencing and multimedia presentation unit in accordance with an embodiment of the present invention.

FIG. 3B depicts an alternate embodiment of unit 110 that includes a first flat-panel touch sensitive display 320, a second display 322, and an integrated video camera 324. In accordance with this dual-display embodiment, unit 10 may be configured to display video data corresponding to a multimedia presentation via first display 320 and video data corresponding to a video teleconference via second display 322. Alternately, unit 110 may be configured to display video data corresponding to a video teleconference via first display 320 and video data corresponding to a multimedia presentation via second display 322.

Thus, this embodiment of the present invention also accommodates the simultaneous display of video data corresponding to a video teleconference and a multimedia presentation. In a further embodiment, unit 110 is also configured to display a GUI via display 320 and/or display 322, as will be described in more detail herein.

1. Hardware Configuration

Figure 4:
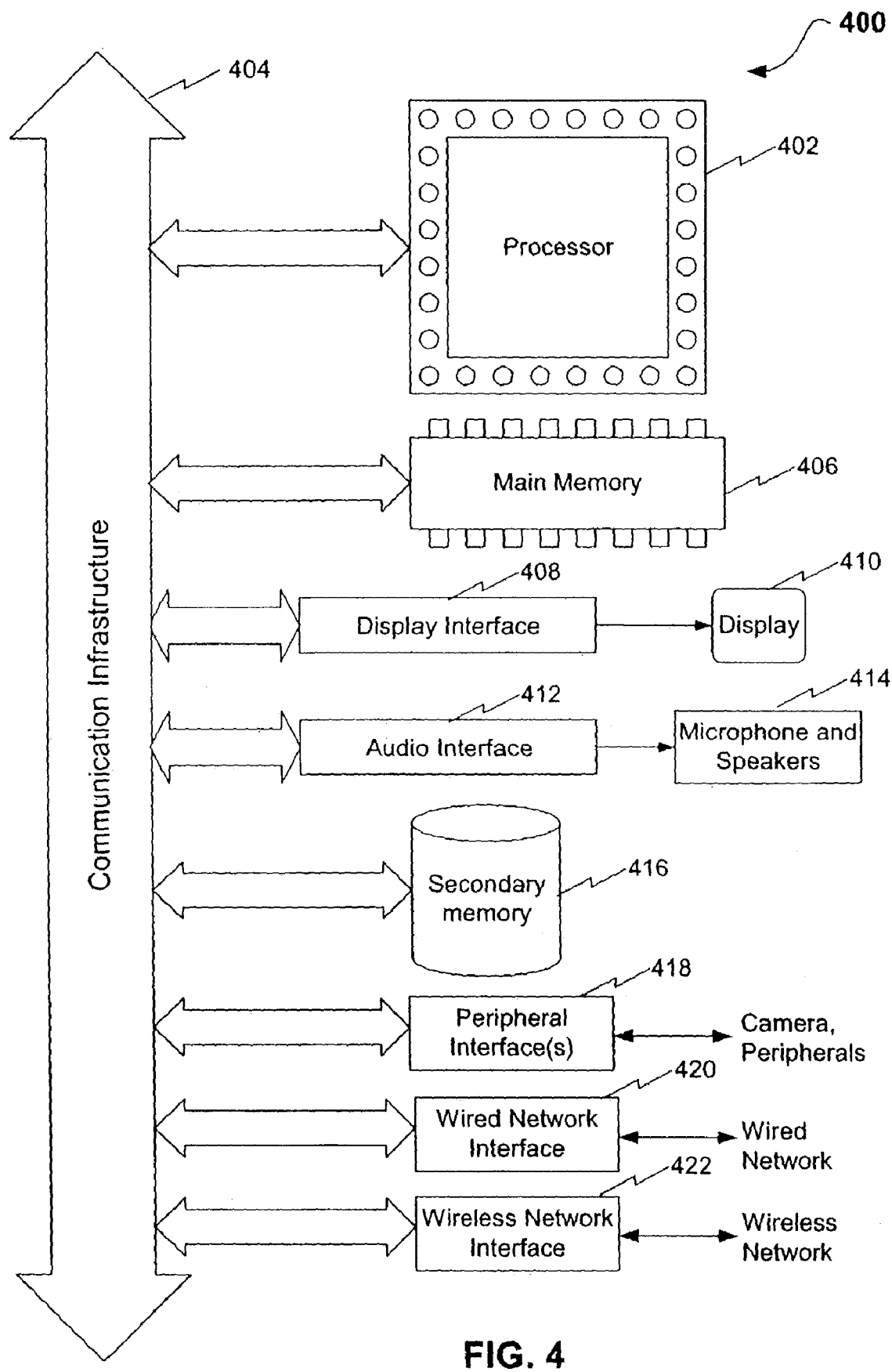
FIG. 4 is a block diagram depicting hardware components of an integrated video teleconferencing and multimedia presentation unit in accordance with an embodiment of the present invention.

Unit 110 essentially comprises a microprocessor-based computer system that executes necessary software components for performing the video teleconferencing and multimedia presentation features of the present invention. FIG. 4 provides a high-level block diagram 400 depicting hardware components of integrated video teleconferencing and multimedia presentation unit 110 in accordance with an embodiment of the present invention.

As shown in FIG. 4, unit 110 includes a microprocessor 402 for executing software routines in accordance with an embodiment of the present invention. Although only a single microprocessor 402 is shown, the present invention is not limited to single-processor systems and also encompasses multi-processor systems. In an embodiment, processor 402 comprises an x86 Pentium®-class microprocessor manufactured by Intel Corporation of Santa Clara, Calif., having at least 800 MHz processing speed, although the invention is not so limited and other processors may be used.

Microprocessor 402 is connected to a communication infrastructure 404 for communication with the other components of unit 110. The communication infrastructure may comprise, for example, one or more communication buses, a cross-bar, or network.

Unit 110 further includes a main memory 406, such as a random access memory (RAM), and a secondary memory 416, which may include, for example, at least one hard disk drive. In an embodiment, main memory 406 comprises at least 512 Mb of high speed SDRAM and secondary memory 416 comprises a hard drive having at least 20 Gb of storage capacity. However, the invention is not so limited, and additional forms of storage may be used for main memory 406 and secondary memory 416, as will be appreciated by persons skilled in the relevant art(s). For example, as will be discussed in more detail herein, secondary memory 416 may further include a CD-RW or DVD-RW drive for archiving video data, audio data and presentation data corresponding to a video teleconference or multimedia presentation.

Unit 110 further includes a display interface 408 that forwards video data, including images, graphics, and text, from the communication infrastructure or a frame buffer (not shown) to a display 410. As discussed above in reference to FIGS. 2 and 3, display 410 preferably comprises at least one touch sensitive display for displaying video data corresponding to a video teleconference, multimedia presentation, and/or GUI. The touch sensitive display is further adapted to receive user input, which is transferred to communication infrastructure 404.

Unit 110 also includes an audio interface 412 and microphone and speakers 414. Microphone and speakers 414 may either be internal or external with respect to unit 110. Audio interface 412 receives audio information from communication infrastructure 404 and forwards it to speakers 414. Audio interface 412 also receives audio information from microphone 414 and forwards it to communication infrastructure 404. In an embodiment, audio interface 412 comprises a sound card that supports at least an 8 KHz sampling rate.

Unit 110 also includes one or more peripheral interfaces 418 for communicating data to and from one or more peripheral devices, including at least one video camera, which may either be internal or external with respect to unit 110. A peripheral interface may comprise an adapter and one or more internal or external connection ports. In an embodiment, peripheral interface(s) 418 may include an USB interface, an RS232 interface, a PCI interface, an IEEE 1394 interface, or a combination of any of the above.

Unit 110 also includes at least one interface for network communication.

The network interface may comprise a wired network interface 420 for connecting to a wired network and/or a wireless network interface 422 for connecting to a wireless network. In an embodiment, wired network interface 420 comprises a 10/100 Mb Ethernet interface and wireless network interface 422 comprises an 802.11b network interface. However, the invention is not so limited and other wired and wireless network interfaces may be used as will be appreciated by persons skilled in the relevant art(s).

Unit 110 further includes at least one power supply and cooling system (not shown). Additional hardware components that may optionally be included in unit 110 but are not depicted in FIG. 4 include, but are not limited to, one or more I/O interfaces for accepting user input from additional I/O devices such as a keyboard or mouse, and a Fibre Channel Host Bus Adapter (HBA) for connecting unit 110 to a Storage Area Network (SAN), Network Attached Storage (NAS), or the like.

2. Software Configuration

The microprocessor 402 of unit 110 executes computer programs, or software, necessary to execute the video conferencing and multimedia presentation features of the present invention. These computer programs may reside in main memory 406 and/or secondary memory 416, and may also be received via wired network interface 420 or wireless network interface 422. Such computer programs, when executed, enable unit 110 to perform the features of the present invention.

As used herein, the term "computer program product" may refer, in part, to a hard disk drive, a CD-ROM or DVD-ROM inserted into secondary memory 416, or to a carrier wave carrying software over a communication path to wired network interface 420 or wireless network interface 422. These computer program products comprise means for providing software to unit 110.

Figure 5A:
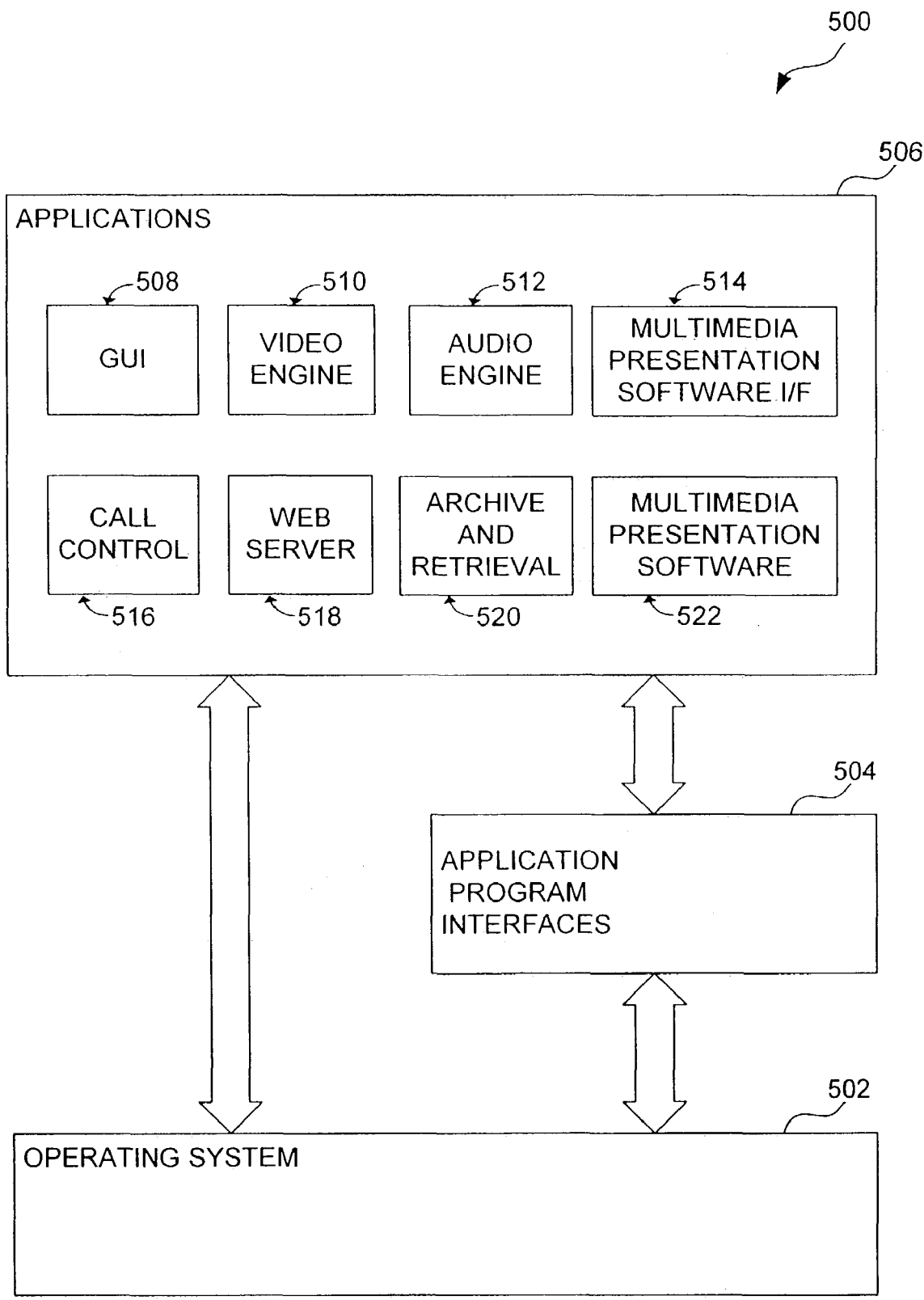
FIGS. 5A and 5B depict exemplary software configurations for an integrated video teleconferencing and multimedia presentation unit in accordance with an embodiment of the present invention.

FIG. 5A depicts an exemplary software configuration 500 in accordance with an embodiment of the present invention. As shown in FIG. 5A, exemplary software configuration 500 includes a plurality of software applications 506, each of which runs under the management of an operating system 502, as will be understood by persons skilled in the relevant art(s). In an embodiment, the operating system comprises a Microsoft® Windows® operating system, such as Windows® XP or Windows® XP Embedded, although the invention is not so limited.

Exemplary software configuration 500 also includes application program interfaces (APIs) 504 that permit application programs 506 to make requests for service to operating system 502, thereby permitting application programs 506 to make use of various functions available to operating system 502. In an embodiment, APIs 504 include Microsoft® DirectX® for performing functions relating to the creation and management of graphics images and multimedia effects in application programs running under the management of the Windows® operating system, as will be appreciated by persons skilled in the relevant art(s).

In accordance with such an embodiment, DirectX® is used by video engine 510 and audio engine 512, as will be described in more detail below.

a. Graphical User Interface

As shown in FIG. 5A, applications 506 include a graphical user interface (GUI) 508. GUI 508 permits a user to perform all the functions necessary to set up and conduct a video teleconference and multimedia presentation via unit 110.

In an embodiment, GUI 508 is displayed on a touch sensitive display, which facilitates the receipt of user input by unit 110.

FIGS. 6, 7, and 8 depict exemplary GUI screens for interfacing to unit 110 in accordance with an embodiment of the present invention. For example, FIG. 6 depicts an example GUI screen 600 for performing set up functions. As shown in FIG. 6, example GUI screen 600 includes a series of checkboxes 610, a video teleconference keypad 620, and an audio conference keypad 630. Checkboxes 610 may be used to specify whether local participant control of unit 110 is permitted, whether remote control of unit 110 is permitted, and whether a conference should be recorded. Video teleconference keypad 620 may be used to initiate a video teleconference, terminate a video teleconference, or search a dialing directory stored in a central database, either internal or external to unit 110, to obtain a necessary number for initiating a video teleconference. Similarly, audio conference keypad 630 may be used to initiate an audio conference, terminate an audio conference, or search a dialing directory stored in a central database, either internal or external to unit 110, to obtain a necessary number for initiating an audio conference.

FIG. 7 depicts an example GUI screen 700 for running a conference or meeting. As shown in FIG. 7, example interface screen 700 includes a "camera" button 710 for accessing control functions of the camera coupled to unit 110, a "presentation" button 720 for accessing functions for initiating and controlling a multimedia presentation, such as a slideshow, an "audio conference" button 730 for accessing functions for initiating, controlling and terminating an audio conference, and a "video conference" button 740 for accessing functions for initiating, controlling and terminating a video teleconference. Example interface screen 700 also includes audio controls 750, which include a sliding bar that permits a user to adjust the volume of the audio delivered by unit 110 and a "mute" button that permits a user to turn the audio on or off entirely, and a recording box 760, which includes an indication of whether a conference is being recorded and the amount of recording time that has elapsed, as well as a "pause" button to pause the recording function. Example interface screen 700 further includes a display window 770 that may be used to display an ongoing video teleconference or a multimedia presentation.

FIG. 8 depicts an example GUI screen 800 for retrieving and playing back archived conferences. As shown in FIG. 8, example GUI screen 800 includes a first "play back" button 810 for initiating retrieval and playback of an archived audio conferences and a second "play back" button 820 for initiating retrieval and playback of an archived video teleconference. Example GUI screen 800 also includes a list of archived audio conferences 830 and a list of archived video teleconferences 840, each of which may be navigated using a scroll bar and scroll arrows in order to select an archived conference for playback purposes. In example GUI screen 800, archived conferences are listed in chronological order along with an indication of the length of each recording.

In an embodiment, GUI 508 is implemented using vector graphics-based animation files authored using software such as Macromedia® Flash™, published by Macromedia Inc. of San Francisco, Calif. The use of Flash™ files to implement GUI 508 provides distinct advantages over using more traditional programming languages, such as C. For example, development of GUI 508 is simpler and easier as compared to programming bit maps in C code. Furthermore, because Flash™ files are small, a complex GUI may be rendered smoothly and at very high speeds. Also, the use of Flash™ files provides a distinct separation between the presentation of GUI 508 and the underlying functionality, such that GUI 508 may be constructed, revised or upgraded without affecting underlying programs.

b. Video Engine

As shown in FIG. 5A, applications 506 also include a video engine 510 that performs functions relating to the capture of video data from the video camera of unit 110, video compression and decompression, and video display. Video engine 510 also interacts with operating system 502 via an API 504, which in an embodiment comprises Microsoft® Direct®, to perform video capture and display functions. In an embodiment, video display functions include the display on unit 110 of video data received from other video teleconferencing systems as well as the display of video data received from the video camera of unit 110.

Video compression is performed prior to transmitting video data to other video teleconferencing units. Conversely, video decompression is performed on compressed video data received from other video teleconferencing units, prior to display. In an embodiment, video compression and decompression is performed in accordance with the ITU-T H.263 standard, although the invention is not so limited.

In an embodiment, video engine 510 interfaces with GUI 508 to permit a user to perform video control functions, including configuring the video camera of unit 110. Alternately, video engine 510 may interface with a user interface provided by operating system 502 to perform such functions.

c. Audio Engine

As shown in FIG. 5A, applications 506 also include an audio engine 512 that performs functions relating to the capture of audio data from the microphone of unit 110, audio compression and decompression, and playback of audio received from other conferencing systems. Audio engine 512 also interacts with operating system 502 via an API 504, which in an embodiment comprises Microsoft® DirectX®, to perform audio capture and playback functions.

Audio encoding, and optionally compression, is performed prior to transmitting audio data to other conferencing units. Conversely, audio decoding, and optionally decompression, is performed on audio data received from other conferencing units, prior to play back. In an embodiment, audio encoding and decoding is performed in accordance with the ITU-T G.711 standard, and audio compression and decompression is performed in accordance with the ITU-T G.723 standard, although the invention is not so limited.

In an embodiment, audio engine 512 interfaces with GUI 508 to permit a user to perform audio control functions. Such audio control functions may include, for example, setting the audio volume level and/or setting the microphone gain level. Additionally, audio engine 512 may interface with GUI 508 to provide feedback to a user, such as providing a graphic indicator that indicates how much energy the microphone is picking up from a user's voice.

d. Multimedia Presentation Software

As shown in FIG. 5A, applications 506 also include multimedia presentation software 522. Multimedia presentation software 522 provides the tools for storing and retrieving multimedia presentations, such as slide shows and animations, that are delivered by unit 110 to other video teleconference units in accordance with an embodiment of the present invention. In an embodiment, multimedia presentation software 522 comprises a presentation graphics program such as Microsoft® PowerPoint™, a spreadsheet program such as Microsoft® Excel®, or a digital multimedia authoring program such as Macromedia® Flash™.

However, these examples are not limiting, and the present invention may implement other multimedia presentation software, as will be appreciated by persons skilled in the relevant art(s).

e. Multimedia Presentation Software Interface

As shown in FIG. 5A, applications 506 also include a multimedia presentation software interface 514. Multimedia presentation software interface 514 essentially acts as an intermediary between GUI 508 and multimedia presentation software 522, permitting a user to start up multimedia presentation software 522, and initiate and control a multimedia presentation for delivery to one or more other video teleconferencing systems.

When unit 110 is engaged in a video teleconference with a remote system that is the same as unit 110, multimedia presentation software interface 514 also interacts with multimedia presentation software residing on the remote system.

In accordance with this peer-to-peer network configuration, multimedia presentation software interface 514 provides the remote system with a copy of the multimedia presentation data prior to initiation of the presentation during a real-time video teleconference. After receiving the multimedia presentation data, the remote system caches it until such time as the presentation begins. When the presentation begins, unit 110 need only send low-bandwidth control signals to the remote system, such as a command to display the next slide, to control the delivery of the presentation to the remote system. Because the presentation data that is being processed by the remote system has already been stored locally with respect to the remote system, this method results in improved viewing of the presentation at the remote system. Thus, the performance of a video teleconference concurrently with the delivery of high or medium bandwidth intensive presentations in real time may be achieved with little or no degradation in the quality of the video teleconference or the presentation at local or remote sites.

In further accordance with this technique, unit 110 can advantageously send low-bandwidth control signals to the remote system to interact with a portion of the presentation even before the entire presentation has been downloaded to the remote system. For example, assume that a presentation comprises a first series of slides that have been completely downloaded to a remote system and a second series of slides that remain to be downloaded. In accordance with an embodiment of the present invention, unit 110 sends control signals to control the presentation of the first series of slides to the remote system prior to, or concurrently with, the downloading of the remainder of the presentation.

f. Call Control Software

As shown in FIG. 5A, applications 506 also include call control software 516. Call control software 516 operates in conjunction with GUI 508 to permit a user of unit 100 to place video teleconference calls, terminate video teleconference calls, and reject video teleconference calls. In an embodiment, call control software performs call control functions in accordance with the ITU-T H.323 protocol and includes, in part, an H.323 call control stack such as that included in the RADVISION® H.323 Protocol Toolkit published by RADVISION, Ltd. of Glen Rock, N.J.

g. Web Server

As shown in FIG. 5A, applications 506 also include a Web server 518. Web server 518 operates to present a Web interface, which may comprise one or more Web pages, to remotely-located users accessing unit 110 via a network connection. As will be discussed in more detail herein, in an embodiment, unit 110 is assigned an IP address that permits it to be accessed by remote computer systems and devices via a packet-switched network to perform wired and wireless uploading and downloading of multimedia presentations as well as remote monitoring and control of unit 110. Web server 518 operates to receive user commands over the network and translate them into proprietary formats suitable for processing by the appropriate applications 506. In an embodiment, Web server 518 comprises Microsoft® Internet Information Server (IIS)® Web server software, although the invention is not so limited.

h. Archive and Retrieval Software

As shown in FIG. 5A, applications 506 also include archive and retrieval software 520. As will be discussed in more detail herein, unit 110 includes an internal storage system and/or is connected to an external storage system for archiving data corresponding to recorded video teleconferences and multimedia presentations. Archive and retrieval software 520 interacts with the storage system to store recorded conference data to the storage system, and to retrieve archived conference data for playback by a user. In an embodiment, archive and retrieval software 520 securely protects archived data by requiring a password or some other evidence of authorization before granting access to it.

Figure 5B:
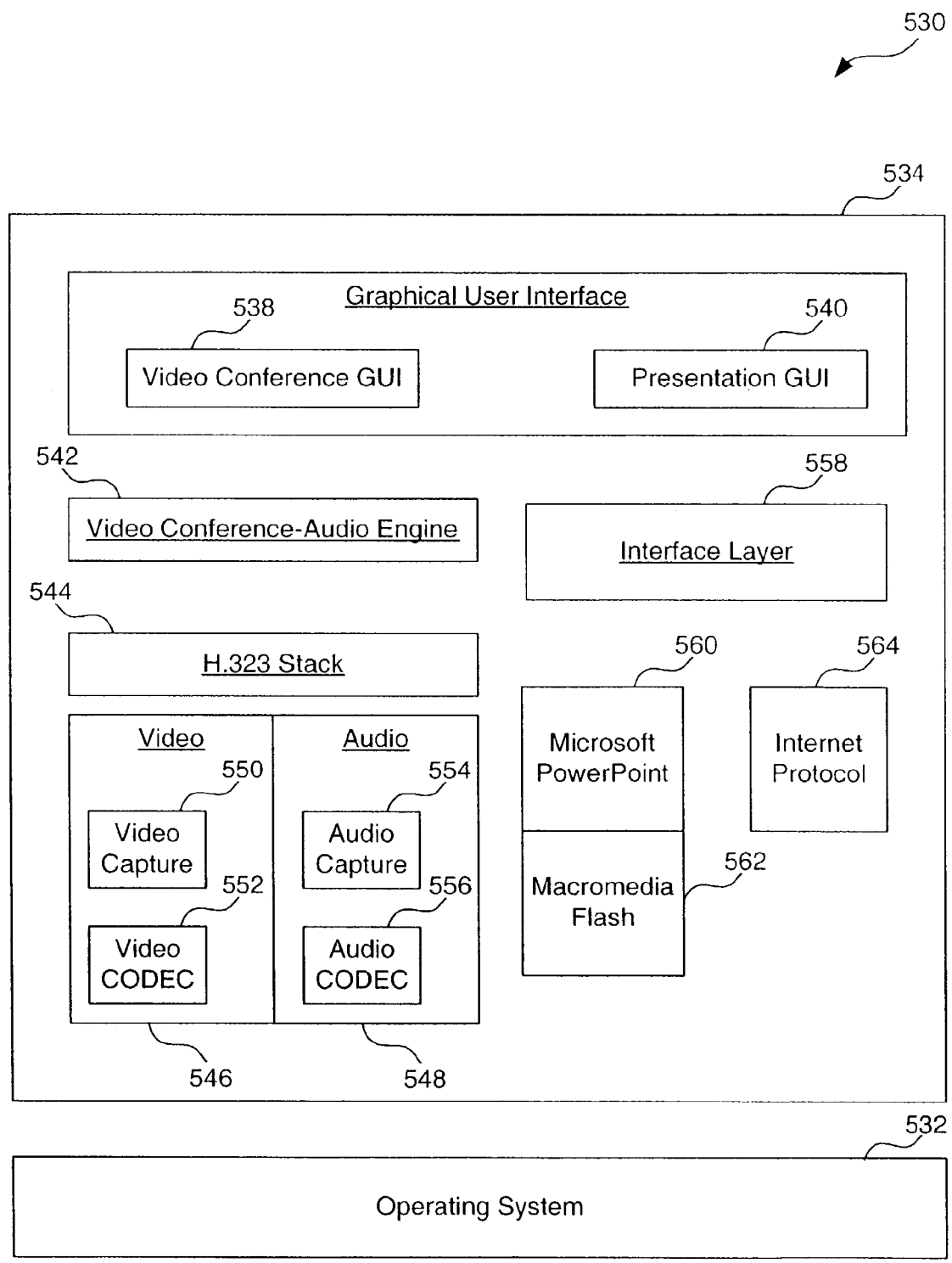

FIG. 5B depicts an exemplary software configuration 530 in accordance with a further embodiment of the present invention. As shown in FIG. 5B, exemplary software configuration 530 includes a plurality of software applications 534 running under the management of an operating system 532. Applications 534 include a GUI 536, which comprises both a video conference GUI 538 and a presentation GUI 540. Video conference GUI 538 enables a user to configure, control, and conduct a video teleconference, while presentation GUI 540 enables a user to configure, control and present a multimedia presentation. Applications 534 also include a video conference-audio engine 542 that manages video and audio streams corresponding to a video teleconference, and possibly a multimedia presentation. Video conference-audio engine 542 operates in conjunction with an H.323 stack 544, which performs necessary H.323-related and call control functions, a video module 546, and an audio module 548. Video module 546 includes a video capture module 550 that performs video capture tasks and a video CODEC 552 that performs video encoding and decoding. Audio module 548 includes an audio capture module 554 that performs audio capture tasks and an audio CODEC 556 the performs audio encoding and decoding. Software applications 534 further include an interface layer 558 that provides logic for interfacing to local multimedia presentation programs, such as Microsoft Microsoft® PowerPoint™ 560 or Macromedia® Flash™ 562, as well as multimedia presentation programs on remote systems, and an Internet Protocol stack 564, for communicating over an IP network.

D. Remote/Wireless Access and Control

Embodiments of the present invention provide various methods for easy remote and/or wireless access and control of integrated video teleconferencing and multimedia presentation unit 110. These methods include remote access and control via a packet-switched network, such as the Internet, as well as wireless local control by a handheld device, such as a personal digital assistant (PDA). Each of these methods will now be described.

FIG. 9 depicts an example system configuration 900 for remote access and control of unit 110 in accordance with an embodiment of the present invention. As shown in FIG. 9, a remote computer system 904 is communicatively connected to unit 110 via a packet-switched network 902. Network 902 may comprise a wired network, such as an Ethernet, a wireless network, such as an 802.11b network, or a combination of a wired and wireless network. Network 902 may also include the Internet.

In order to achieve this type of remote access, unit 110 is assigned an IP address, which is assigned either by an external network entity via Dynamic Host Configuration Protocol (DHCP) or may comprise a static IP address. In either case, the IP address is displayed by unit 110 via its GUI after it has been assigned so that it may be viewed by other remotely-connected video teleconferencing systems. By typing this IP address into a Web server, remote users can then access and interact with unit 110 via a Web server, such as Web server 518 described above in reference to FIG. 5A.

In accordance with an embodiment of the invention, unit 110 permits the user of remote computer system 904 to conveniently upload and download multimedia presentation data to and from unit 110, as well as download archived conference data from unit 110. The user of remote computer system 904 may also perform remote control functions, such as initiating, controlling or terminating a multimedia presentation stored on unit 110, commanding unit 110 to record a conference, or adjusting the camera of unit 110. Furthermore, the user of remote computer system 904 may perform remote monitoring functions, including determining the operating status of unit 110 (e.g., how much storage space is remaining, whether a conference is occurring, the amount of conference time elapsed, and the like). Additionally, the user of remote computer system 904 may perform remote maintenance functions, such as delivering software upgrades and patches to unit 110.

FIG. 10 depicts an example system configuration 1000 for wireless local control of unit 110 in accordance with an embodiment of the present invention. As shown in FIG. 10, a handheld device 1004, such as a PDA, is communicatively connected to unit 110 via a wireless network 1002. In an embodiment, handheld device 1004 comprises a Microsoft® PocketPC™-compatible PDA and wireless network 1002 comprises an 802.11b network, although the invention is not so limited.

Handheld device 1004 runs a proprietary software application that utilizes the IP address of unit 110 to directly access unit 110 over wireless network 1002. The proprietary software application provides a GUI for receiving user input, interprets such input to generate one or more user commands, and then transmits those commands out via wireless network 1002 to unit 110, which receives and processes them. Control functions that may be carried out in this manner include any of the functions that could normally be carried out by using the touch-screen display of unit 110, including but not limited to setting up, initiating, operating, and recording a video teleconference and/or multimedia presentation, configuring and controlling the video camera, microphone and speakers of unit 110, altering the display configuration, and configuring aspects of video engine 510 or audio engine 512.

In the above-described embodiment, handheld device 1004 directly accesses and controls unit 110. In an alternate embodiment of the present invention, unit 110 is installed as part of a network, such as an office network, and handheld device 1004 communicates indirectly with unit 110 through a central network server. For example, commands entered into handheld device 1004 are sent by handheld device 1004 to the central server, which forwards them to unit 110. An example central network server that may be used to implement such an embodiment is described in co-pending patent application Ser. No. 10/180,500, filed Jun. 27,2002 and entitled "Method, System and Computer Program Product for Managing Controlled Residential or Non-residential Environments," the entirety of which is incorporated by reference herein. In accordance with this network configuration, handheld device 1004 can control a variety of different devices that are connected to the network, including unit 110, via the central server.

In further accordance with this embodiment, when unit 110 is connected to the network, the central server automatically detects its presence on the network and communicates information concerning unit 110 to PDA 1004. In response, the GUI of handheld device 1004 provides a control icon for unit 110 that permits a user to control unit 110. Conversely, when unit 110 is no longer available on the network, the central server automatically detects its absence and communicates information concerning its absence to handheld device 1004. In response, the GUI of handheld device 1004 reconfigures itself to reflect this fact.

E. Archive and Retrieval of Conference Data

Embodiments of the present invention provide an easy method for recording, archiving and retrieving recorded video teleconferences and/or multimedia presentations. In particular, as discussed above in reference to FIG. 5A, GUI 508 and archive and retrieval software 520 permit a user of unit 110 to record a video teleconference and/or multimedia presentation, and archive the recorded data to a storage system internal or external to unit 110 for subsequent retrieval and playback. As discussed above in reference to FIG. 9, archived data may also be accessed remotely via a packet-switched network. Archived data may be securely protected by requiring a password or some other evidence of authorization before retrieving archived data.

In an embodiment, the storage system may comprise one or more CD-RW or DVD-RW drives internal to unit 110. Alternately, the storage system may comprise external systems, including but not limited to network attached storage (NAS) and/or a storage area network (SAN).

F. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. An integrated video teleconferencing system, comprising:
   a processor configured to receive a copy of a multimedia presentation from a remote video teleconferencing system;
   a memory configured to store said copy of said multimedia presentation;
   display means;
   one or more speakers; and
   a storage system;
   wherein said processor is further configured to receive audio and video data corresponding to a video teleconference from said remote video teleconferencing system, said received audio data representing data captured by a microphone and said received video data representing data captured by a camera, to play said received audio data via at least one of said one or more speakers, to present said received video data to said display means, to receive commands from said remote video teleconferencing system during said video teleconference, said commands for initiating and controlling display of said copy of said multimedia presentation to said display means, to record said audio and video data and said commands received from said remote video teleconferencing system, and to store said recorded audio and video data, said recorded commands, and said copy of said multimedia presentation to said storage system in a manner that allows for repeated concurrent playback of said video teleconference and presentation of said copy of said multimedia presentation.

2. The integrated video teleconferencing system of claim 1, further comprising a network interface for receiving said copy of said multimedia presentation, said audio and video data, and said commands from said remote video teleconferencing system over a network.

3. The integrated video teleconferencing system of claim 2, wherein said network interface comprises an interface to a local area network.

4. The integrated video teleconferencing system of claim 2, wherein said network interface comprises an interface to a wide area network.

5. The integrated video teleconferencing system of claim 1, further comprising:
a wireless network interface;
wherein said processor is further configured to receive user input from a handheld device via said wireless network interface.

6. The integrated video teleconferencing system of claim 5, wherein said processor is further configured to receive user input from a personal digital assistant via said wireless network interface.

7. The integrated video teleconferencing system of claim 1, wherein said processor is further configured to receive said copy of said multimedia presentation concurrently with receiving said commands.

8. The integrated video teleconferencing system of claim 1, wherein said display means comprises a touch sensitive display.

9. The integrated video teleconferencing system of claim 1, wherein said display means comprises a display having a first display area for displaying said received video data and a second display area for displaying said copy of said multimedia presentation.

10. The integrated video teleconferencing system of claim 1, wherein said display means comprises a first display configured to display said received video data and a second display configured to display said copy of said multimedia presentation.

11. The integrated video teleconferencing system of claim 1, wherein said storage system comprises one of: an optical disk drive, a storage area network, or network attached storage.

12. The integrated video teleconferencing system of claim 1, wherein said processor is further configured to retrieve said recorded audio and video data, said recorded commands, and said copy of said multimedia presentation from said storage system and to play back the video teleconference based on said recorded audio and video data and concurrently present said copy of said multimedia presentation in accordance with said recorded commands.

13. The integrated video teleconferencing system of claim 1, wherein said processor is further configured to provide a web interface to a remote computer system, and to receive input from a user of said remote computer system via said web interface.

14. An integrated video teleconferencing and multimedia presentation unit comprising:
a communication infrastructure;
a video camera connected to the communication infrastructure;
a microphone connected to the communication infrastructure;
input/output (I/O) means connected to the communication infrastructure;
a network interface connected to the communication infrastructure, the network interface providing a means to communicate with a remote integrated video teleconferencing and multimedia presentation unit over a network;
a processor connected to the communication infrastructure; and
one or more memory devices connected to the communication infrastructure, at least one of the one or more memory devices storing software routines for execution by the processor, the software routines configured to enable the processor to transmit audio information captured by the microphone and video information captured by the video camera to the remote integrated video teleconferencing and multimedia presentation unit for playback thereon and to concurrently transmit commands submitted by a user using the I/O means to the remote integrated video teleconferencing and multimedia presentation unit, the commands being useable by the remote integrated video teleconferencing and multimedia presentation unit to control presentation of a first multimedia presentation thereon.

15. The integrated video teleconferencing and multimedia presentation unit of claim 14, wherein the network interface comprises a wide area network interface.

16. The integrated video teleconferencing and multimedia presentation unit of claim 15, further comprising:
a storage system connected to the communication infrastructure;
wherein the software routines are further configured to enable the processor to store the second multimedia presentation, the received audio and video information, and the received commands to the storage system.

17. The integrated video teleconferencing and multimedia presentation unit of claim 16, wherein the storage system comprises one of: an optical disk drive, a storage area network, or network attached storage.

18. The integrated video teleconferencing and multimedia system of claim 16, wherein said processor is further configured to retrieve the second multimedia presentation, the received audio and video information and the received commands from the storage system.

19. The integrated video teleconferencing and multimedia presentation unit of claim 15, wherein the I/O means and the display means comprise a touch sensitive display.

20. The integrated video teleconferencing and multimedia presentation unit of claim 14, further comprising:
display means connected to the communication infrastructure;
one or more speakers connected to the communication infrastructure;
wherein the software routines are further configured to enable the processor to receive audio information and video information from the remote integrated video teleconferencing and multimedia presentation unit, to play the received audio information via at least one of the one or more speakers, to present the received video information to the display means, to present a second multimedia presentation to the display means, and to control the presentation of the second multimedia presentation based on commands received from the remote integrated video teleconferencing and multimedia presentation unit concurrently with the received audio information and received video information.

21. The integrated video teleconferencing and multimedia presentation unit of claim 20, wherein the software routines are further configured to enable the processor to receive the second multimedia presentation for storage in one of the one or more memory devices prior to receiving the audio and video information and commands from the remote integrated video teleconferencing and multimedia presentation unit.

22. The integrated video teleconferencing and multimedia presentation unit of claim 20, wherein the display means comprises a single display comprising a first display area for displaying the received audio and video information and a second display area for displaying the second multimedia presentation.

23. The integrated video teleconferencing and multimedia presentation unit of claim 20, wherein the display means comprises a first display for displaying the received audio and video information and a second display for displaying the second multimedia presentation.

24. The integrated video teleconferencing and multimedia presentation unit of claim 14, wherein the network interface comprises a local area network interface.

25. The integrated video teleconferencing and multimedia presentation unit of claim 14, wherein the software routines are further configured to enable the processor to transfer the first multimedia presentation from one of the one or more memory devices to the remote integrated video teleconferencing and multimedia presentation unit prior to transmission of the audio and video information and the commands.

26. A method for concurrently conducting a video teleconference and delivering a multimedia presentation, comprising:
transmitting a copy of a multimedia presentation from a first video teleconferencing system to a second video teleconferencing system, wherein said second video teleconferencing system is remotely located with respect to said first video teleconferencing system;
storing said copy of said multimedia presentation locally with respect to said second video teleconferencing system;
initiating a video teleconference between said first video teleconferencing system and said second video teleconferencing system; and
during said video teleconference, (a) transmitting audio and video data from said first video teleconferencing system to said second video teleconferencing system over a network, wherein said audio data represents data captured by a microphone and said video data represents data captured by a camera, and concurrently transmitting commands from said first video teleconferencing system to said second video teleconferencing system over said network to initiate and control display of said copy of said multimedia presentation on said second video teleconferencing system, (b) recording said audio and video data and said commands transmitted from the first video teleconferencing system, and (c) storing said recorded audio and video data, said recorded commands, and said copy of said multimedia presentation to a storage system in a manner that allows for repeated concurrent playback of said video teleconference and presentation of said copy of said multimedia presentation.

27. The method of claim 26, further comprising:
accessing said first video teleconferencing system from a computer system that is remotely located with respect to said first video teleconferencing system, wherein said accessing comprises using a web interface.

28. The method of claim 27, further comprising:
transmitting said multimedia presentation from said computer system to said first video teleconferencing system using said web interface.

29. The method of claim 26, further comprising:
transmitting commands for controlling said first video teleconferencing system from a handheld device to said first video teleconferencing system over a wireless network.

30. The method of claim 29, wherein said handheld device comprises a personal digital assistant.

31. The method of claim 26, wherein said copy of said multimedia presentation comprises a slide presentation.

32. The method of claim 31, wherein said commands for controlling display of said copy of said multimedia presentation includes a command for advancing to a next slide of said slide presentation.

33. The method of claim 26, wherein transmitting said copy of said multimedia presentation occurs concurrently with said transmitting said commands.

34. The method of claim 26, wherein said storing said recorded audio and video data, said recorded commands, and said copy of said multimedia presentation to a storage system comprises storing said recorded audio and video data, said recorded commands and said copy of said multimedia presentation to one of: an optical disk drive, a storage area network, or network attached storage.

35. The method of claim 26, further comprising retrieving said recorded audio and video data, said recorded commands and said copy of said multimedia presentation from said storage system and playing back the video teleconference based on said recorded audio and video data and concurrently presenting said copy of the multimedia presentation in accordance with said recorded commands.

36. The method of claim 26, wherein said transmitting said copy of said multimedia presentation, transmitting said audio and video data, and transmitting said commands comprises transmitting data over a local area network.

37. The method of claim 26, wherein said transmitting said copy of said multimedia presentation, transmitting said audio and video data, and transmitting said commands comprises transmitting data over a wide area network.

38. A computer program product comprising a tangible computer useable medium having computer program logic recorded thereon for enabling a processor in a video teleconferencing system to concurrently conduct a video teleconference and present a multimedia presentation, said computer program logic comprising:
means for enabling the processor to receive a copy of a multimedia presentation from a remote video teleconferencing system;
means for enabling the processor to store said copy of said multimedia presentation;
means for enabling the processor to receive audio and video data corresponding to a video teleconference from said remote video teleconferencing system, said audio data representing data captured by a microphone and said video data representing data captured by a camera, to play the received audio data via one or more speakers, to present the received video data to a display means, and to receive commands from said remote video teleconferencing system during said video teleconference, said commands for initiating and controlling display of said copy of said multimedia presentation to said display means; and means for enabling the processor to record said audio and video data and said commands received from said remote video teleconferencing system and to store said recorded audio and video data, said recorded commands, and said copy of said multimedia presentation to a storage system in a manner that allows for repeated concurrent playback of said video teleconference and presentation of said copy of said multimedia presentation.

39. The computer program product of claim 38, wherein said means for enabling the processor to receive a copy of said multimedia presentation comprises means for enabling the processor to receive said copy of said multimedia presentation concurrently with receiving said commands.

40. The computer program product of claim 38, further comprising means for enabling the processor to retrieve said recorded audio and video data, said recorded commands, and said copy of said multimedia presentation from said storage system and to play back the video teleconference based on said recorded audio and video data and concurrently present said copy of said multimedia presentation in accordance with said recorded commands.

41. The computer program product of claim 38, further comprising means for enabling the processor to receive said audio and video data, said copy of aid multimedia presentation and said commands from said remote video teleconferencing system over a local area network.

42. The computer program product of claim 38, further comprising means for enabling the processor to receive said audio and video data, said copy of said multimedia presentation and said commands from said remote video teleconferencing system over a wide area network.

43. The computer program product of claim 38, further comprising:

means for enabling the processor to provide a web interface to a remote computer system; and means to enable the processor to receive input from a user of said remote computer system via said web interface.

44. The computer program product of claim 38, further comprising:

means for enabling the processor to receive user input from a handheld device via a wireless network interface.

\* \* \* \* \*